(12) United States Patent
Malrnskog

(10) Patent No.: US 7,127,503 B2
(45) Date of Patent: Oct. 24, 2006

(54) COMPUTER NETWORKING SYSTEM, DEVICE, AND METHOD FOR IMPROVED SPEED IN WEB PAGE RENDERING

(75) Inventor: Steve Malrnskog, San Jose, CA (US)

(73) Assignee: Juniper Networks, Inc., Sunnyvale, CA (US)

(*) Notice: Subject to any disclaimer, the term of this patent is extended or adjusted under 35 U.S.C. 154(b) by 698 days.

(21) Appl. No.: 09/975,282

(22) Filed: Oct. 10, 2001

(65) Prior Publication Data

US 2003/0069927 A1   Apr. 10, 2003

(51) Int. Cl.
G06F 15/16 (2006.01)
G06F 17/00 (2006.01)
G06F 17/24 (2006.01)
G06F 9/00 (2006.01)
G06F 9/44 (2006.01)
G06F 13/00 (2006.01)
G06F 15/00 (2006.01)
G06F 17/21 (2006.01)
G06F 3/00 (2006.01)
G06F 9/46 (2006.01)

(52) U.S. Cl. .............. 709/219; 709/203; 709/232; 709/237; 709/246; 715/513; 715/768; 719/313; 719/330

(58) Field of Classification Search ................ 709/232, 709/201–203, 246, 217–219, 225–229, 237; 715/513, 760, 768; 713/100; 719/313, 330
See application file for complete search history.

(56) References Cited

U.S. PATENT DOCUMENTS

| 5,727,159 A | 3/1998 | Kikinis |
| 5,864,366 A | 1/1999 | Yeo |
| 5,918,013 A | 6/1999 | Mighdoll et al. |
| 6,029,182 A | 2/2000 | Nehab et al. |
| 6,031,989 A | 2/2000 | Cordell |
| 6,049,342 A | 4/2000 | Nielsen et al. |
| 6,049,821 A | 4/2000 | Theriault et al. |
| 6,058,428 A | 5/2000 | Wang et al. |
| 6,081,835 A | 6/2000 | Antcliff et al. |
| 6,092,099 A | 7/2000 | Irie et al. |
| 6,122,666 A | 9/2000 | Beurket et al. |
| 6,128,655 A | 10/2000 | Fields et al. |
| 6,247,048 B1 | 6/2001 | Greer et al. |
| 6,266,369 B1 | 7/2001 | Wang et al. |
| 6,275,301 B1 | 8/2001 | Bobrow et al. |
| 6,275,829 B1 | 8/2001 | Angiulo et al. |
| 6,300,959 B1 | 10/2001 | Gabler et al. |
| 6,304,676 B1 | 10/2001 | Mathews |

(Continued)

FOREIGN PATENT DOCUMENTS

EP    0811939    12/1997

(Continued)

OTHER PUBLICATIONS

"eekim.com", CGI Programming Slides, 1996.*

(Continued)

Primary Examiner—Jason Cardone
Assistant Examiner—Melvin H. Pollack
(74) Attorney, Agent, or Firm—Shumaker & Sieffert, P.A.

(57) ABSTRACT

A system, method, and device for computer networking is disclosed. According to one embodiment of the invention, the method includes receiving from a remote client a request for a web resource. The method further includes, prior to processing the request, sending a message adapted to initiate the page rendering process in the client's browser window.

42 Claims, 9 Drawing Sheets

U.S. PATENT DOCUMENTS

| | | | |
|---|---|---|---|
| 6,311,223 B1 | 10/2001 | Bodin et al. | |
| 6,317,790 B1 | 11/2001 | Bowker et al. | |
| 6,332,131 B1 | 12/2001 | Grandcolas et al. | |
| 6,345,279 B1 | 2/2002 | Li et al. | |
| 6,377,928 B1* | 4/2002 | Saxena et al. | 704/275 |
| 6,424,981 B1 | 7/2002 | Isaac et al. | |
| 6,438,125 B1 | 8/2002 | Brothers | |
| 6,449,658 B1 | 9/2002 | Lafe et al. | |
| 6,470,027 B1* | 10/2002 | Birrell, Jr. | 370/465 |
| 6,535,896 B1 | 3/2003 | Britton et al. | |
| 6,546,388 B1 | 4/2003 | Edlund et al. | |
| 6,557,005 B1 | 4/2003 | Burget | |
| 6,563,517 B1 | 5/2003 | Bhagwat et al. | |
| 6,578,073 B1 | 6/2003 | Starnes et al. | |
| 6,615,266 B1 | 9/2003 | Hoffman et al. | |
| 6,631,298 B1 | 10/2003 | Pagnano et al. | |
| 6,636,894 B1* | 10/2003 | Short et al. | 709/225 |
| 6,704,024 B1* | 3/2004 | Robotham et al. | 345/581 |
| 6,728,785 B1 | 4/2004 | Jungck | |
| 6,742,043 B1* | 5/2004 | Moussa et al. | 709/232 |
| 6,760,759 B1* | 7/2004 | Chan | 709/219 |
| 6,834,297 B1* | 12/2004 | Peiffer et al. | 709/219 |
| 6,925,595 B1 | 8/2005 | Whitledge et al. | |
| 6,948,174 B1* | 9/2005 | Chiang et al. | 719/319 |
| 6,957,390 B1* | 10/2005 | Tamir et al. | 715/744 |
| 6,976,090 B1* | 12/2005 | Ben-Shaul et al. | 709/246 |
| 7,062,570 B1* | 6/2006 | Hong et al. | 709/238 |
| 7,072,984 B1* | 7/2006 | Polonsky et al. | 709/246 |
| 2002/0071436 A1* | 6/2002 | Border et al. | 370/395.32 |
| 2002/0078164 A1* | 6/2002 | Reinschmidt | 709/217 |
| 2002/0112078 A1* | 8/2002 | Yach | 709/246 |
| 2003/0051002 A1* | 3/2003 | Bogia et al. | 709/218 |
| 2005/0080876 A1 | 4/2005 | Peiffer et al. | |

FOREIGN PATENT DOCUMENTS

| | | |
|---|---|---|
| EP | 0994426 | 4/2000 |
| JP | 10224523 | 8/1998 |
| JP | 10254888 | 9/1998 |
| JP | 10285502 | 10/1998 |
| JP | 10301943 | 11/1998 |
| WO | WO 00/68832 | 11/2000 |
| WO | WO 01/27711 | 4/2001 |

OTHER PUBLICATIONS

Phelps, Thomas and Wilensky, Robert. "The Multivalent Browser: A Platform for New Ideas," Proceedings of the 2001 ACM Symposium on Document Engineering, Nov. 9-10, 2001, pp. 58-67.*

Simpson, W. "PPP Challenge Handshake Authentication Protocol (CHAP)," RFC 1994, Aug. 1996, pp. 1-12.*

Zorn, G. and Cobb, S. "Microsoft PPP CHAP Extensions," RFC 2433, Oct. 1998, pp. 1-20.*

Zorn, G. "Microsoft PPP CHAP Extensions, Version 2," RFC 2759, Jan. 2000, pp. 1-20 and Errata.*

Johnson, "Converting PC GUIs for NonPC Devices," Circuit Cellar Inc, pp. 40-42 and 44, vol. 91, Feb. 1998.

Fox et al., "Reducing WWW Latency and Bandwidth Requirements by Real-Time Distillation," Computer Networks and ISDN Systems, North Holland Publishing, Amsterdam, NL, pp. 1445-1456, vol. 28, No. 11, May 1996.

Mohan R., Smith J.R., "Content Adaptation Framework," IEEE; Global Telecommunications Network, 1999, vol. 4, pp. 2015-2021.

Bharadvaj H., Joshi A., "An Active Transcoding Proxy to Support Mobile Web Access," IEEE Symposium; Reliable Distributed Systems, Oct. 1998, pp. 118-123.

Spyglass, Inc., http://www.spyglass.com, http://webarchive.org/web/19990429034543/http://www.spyglass.com, Apr. 29, 1999.

U.S. Appl. No. 09/680,998, entitled "Web Page Source File Transfer System and Method," filed Oct. 6, 2000.

U.S. Appl. No. 10/996,871, entitled "Rule-Based Networking Device," filed Nov. 23, 2004.

U.S. Appl. No. 11/226,917, entitled "Rewriting Cookies With A Rule-Based Networking Device," filed Sep. 14, 2005.

* cited by examiner

Time 1 192.168.0.100 > normal.80: S 1271649857 : 1271649857 (0) win 16384 <mss 1460> (DF)

Time 2 normal.80 > 192.168.0.100: S 684023587 : 684023587 (0) ack 1271649858 win 65535 <mss 1460> (DF)

Time 3 192.168.0.100 > normal.80: . ack 1 win 17520 (DF)

Time 4 192.168.0.100 > normal.80: P 1:346(345) ack 1 win 17520 (DF)

Time 5 normal.80 > 192.168.0.100: . ack 346 win 65355 (DF)

Time 6 normal.80 > 192.168.0.100: . 1:1461(1460) ack 346 win 65535 (DF)

Time 7 normal.80 > 192.168.0.100: . 1461:2921(1460) ack 346 win 65535 (DF)

Time 8 192.168.0.100 > normal.80: . ack 2921 win 17520 (DF)

Time 9 normal.80 > 192.168.0.100: . 2921:4381(1460) ack 346 win 65535 (DF)

Time 10 normal.80 > 192.168.0.100: . 4381:5841(1460) ack 346 win 65535 (DF)

Time 11 normal.80 > 192.168.0.100: . 5841:7301(1460) ack 346 win 65535 (DF)

Time 12 192.168.0.100 > normal.80: . ack 7301 win 17236 (DF)

Time 13 normal.80 > 192.168.0.100: . 7301:8650(1349) ack 346 win 65535 (DF)

Fig. 10

Time 1 192.168.0.100 > accelerator.80: S 1267618160:1267618160 (0) win 16384 <mss 1460> (DF)

Time 2 accelerated.80 > 192.168.0.100: S 1364115003:1364115003 (0) ack 1267618161 win 17520 <mss 1460> (DF)

Time 3 192.168.0.100 > accelerator.80: . ack 1 win 17520 (DF)

Time 4 192.168.0.100 > accelerator.80: P 1:351(350) ack 1 win 17520 (DF)

Time 5 accelerator.80 > 192.168.0.100: . ack 351 win 32418 (DF)

Time 6 accelerator.80 > 192.168.0.100: . 1:5(4) ack 351 win 32768 (DF)

Time 7 accelerator.80 > 192.168.0.100: . 5:115(110) ack 351 win 65535 (DF)

Time 8 accelerator.80 > 192.168.0.100: . 115:1575(1460) ack 351 win 65535 (DF)

Time 9 accelerator.80 > 192.168.0.100: . 1575:2825(1460) ack 351 win 65535 (DF)

Time 10 192.168.0.100 > accelerator.80: . ack 2825 win 17520 (DF)

Time 11 accelerator.80 > 192.168.0.100: . 2825:4285(1460) ack 346 win 65535 (DF)

Time 12 accelerator.80 > 192.168.0.100: . 4285:5724(1457) ack 346 win 65535 (DF)

Time 13 accelerator.80 > 192.168.0.100: . 5724:7198(1456) ack 346 win 65535 (DF)

Time 14 accelerator.80 > 192.168.0.100: . 7198:8650(1452) ack 346 win 65535 (DF)

Fig. 11

COMPUTER NETWORKING SYSTEM, DEVICE, AND METHOD FOR IMPROVED SPEED IN WEB PAGE RENDERING

TECHNICAL FIELD

The present invention relates generally to data transmission on computer networks, and more particularly to a server response system, device, and method for causing a web resource to be quickly displayed on a browser.

BACKGROUND OF THE INVENTION

The Internet has experienced explosive growth in recent years. The emergence of the World Wide Web has enabled millions of users around the world to download easily web pages containing text, graphics, video, and sound data while at home, work, or from remote locations via wireless devices. These web pages often are large in size and therefore require a long time to download, causing the user delay and frustration. Delay often causes users to abandon the requested web page and move on to another web page, resulting in lost revenue and exposure for many commercial web sites.

Delay downloading a web page can be caused by a number of factors. At the server, a large volume of page requests may overload the capacity of the server and result in unanswered or late-answered requests. Within the computer network, network congestion and limited bandwidth may cause delay in the transmission of data. Particularly problematic is the so-called "last mile" between many home users and their Internet Service Provider. For a majority of Internet users, the last mile is typically a telephone modem connection configured to operate at speeds at or lower than 56K baud. For these users, large web pages take an agonizingly long time to download.

Part of the delay in downloading a web page is caused by the need for a web browser to initially erase, or "wipe," the page that is currently being viewed by the user before replacing the page with new content. Typically, the browser window is wiped after the browser begins receiving requested content from the server. Thus, after clicking on a link, a user must wait for the request to travel to the server, for the server to process the request and send the requested data to the client, and for the browser to wipe its screen to display the data. This results in cumulative delay every time the user downloads a web page, making the user's experience less pleasant.

It would be desirable to provide a server response system, device, and method for causing a web resource to be quickly displayed on a browser, minimizing delay and decreasing user frustration.

SUMMARY OF THE INVENTION

A system, method, and device for computer networking are provided. The method typically includes receiving a request for a web resource from a remote client and obtaining an original web resource corresponding to the requested web resource. The method further typically includes, upon receipt of and prior to processing the request, initially sending a predetermined application level message adapted to initiate a page rendering process.

BRIEF DESCRIPTION OF THE DRAWINGS

FIG. 10 is an exemplary timelog of a prior art transmission between a server and a client.

FIG. 11 is an exemplary timelog of a transmission between a server and a client according to one embodiment of the present invention.

DETAILED DESCRIPTION OF THE INVENTION

Figure 1:
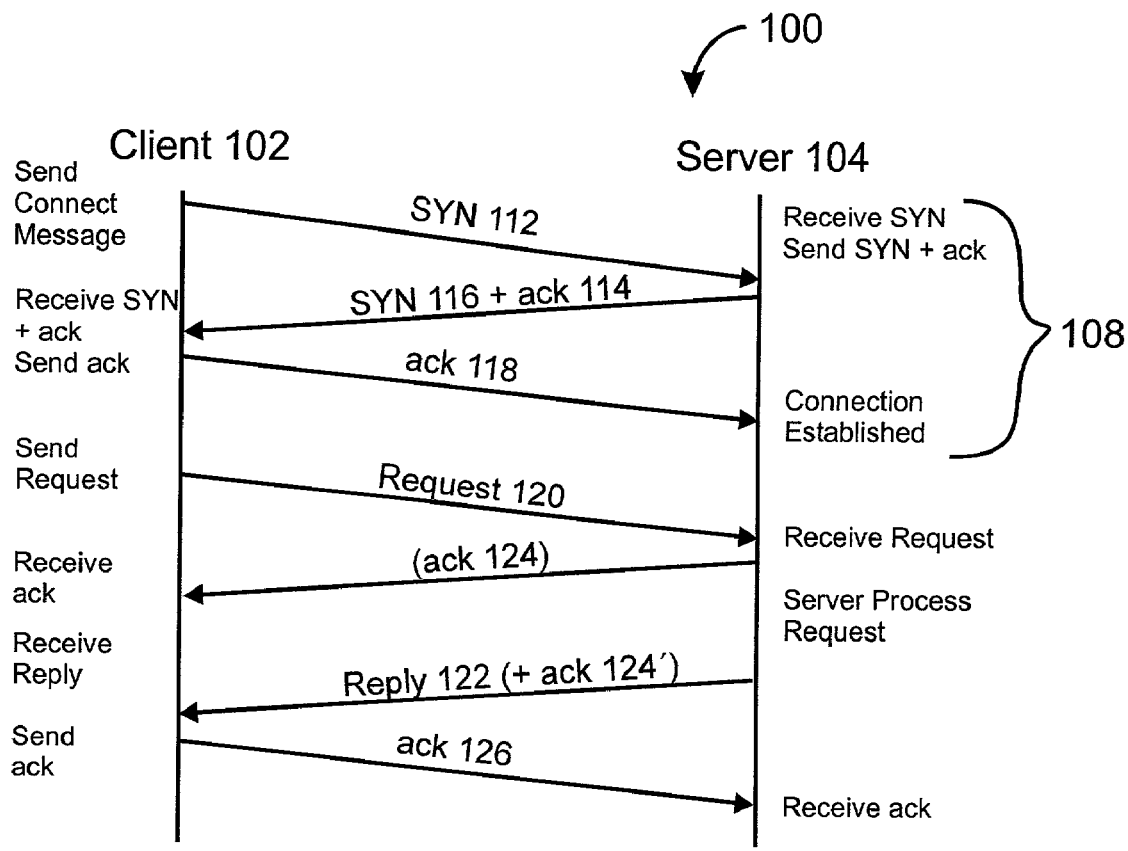
FIG. 1 is a schema of a prior art TCP network packet exchange.

FIG. 1 is a schematic representation of a prior art packet exchange 100 between a client 102 and a server 104 through a TCP connection. Client 102 is typically a personal computer configured to run a web browser by which a user may download and display web resources from the Internet. Server 104 is typically a web server configured to server web resources in response to client requests.

As shown, the client 102 and server 104 initially establish a connection by the completion of a three-way handshake 108 in which the client issues an initial "connect" message 110 which causes the client TCP routines to send a synchronize segment (SYN) 112. SYN 112 tells server 104 the client's initial sequence number for the data that the client will send on the connection. Normally no data is sent with SYN 112. In order to acknowledge SYN 112, server 104 sends an acknowledgment (ack) 114. Along with ack 114, server 104 sends SYN 116, which contains the initial sequence number for the data that server 102 will send on the connection. The server's ack 114 and SYN 116 typically are sent as a single segment. In response, the client acknowledges the server's SYN 116 by sending a third ack 118. Upon receipt of ack 118 by server 104, the connection between client 102 and server 104 is established.

Once the connection is established, client 102 may send a request 120 to server 104. Request 120 may be, for example, a request for a web resource to be displayed on a client browser. Server 104 may send an ack 124 in response to request 120. Alternatively, ack 124 may be delayed until server 104 processes request 120. In this case, ack 124' is sent with reply 122 to client 102. Once reply 122 is received from client 102, any previously displayed web resource must be wiped from the client browser before the new web resource can be displayed. Client 102 then sends an ack 126 to server 104. This process is repeated each time client 102 sends a request to server 104.

Figure 2:
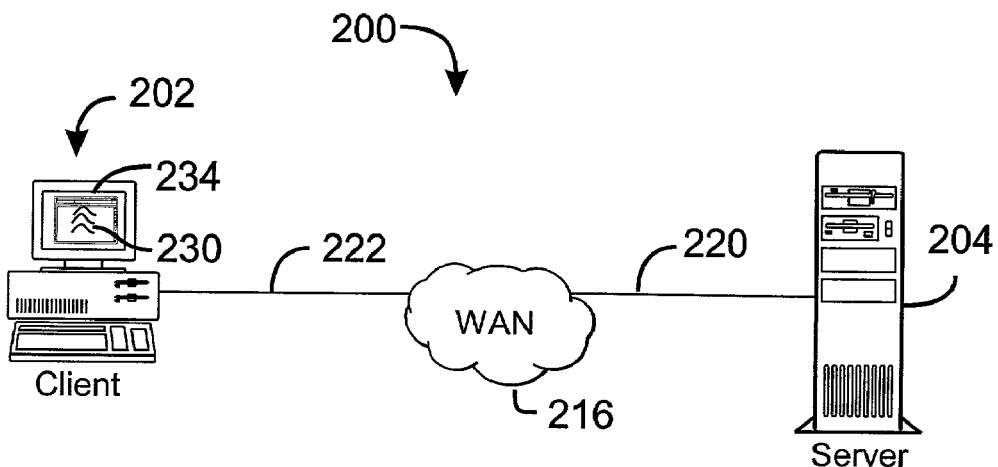
FIG. 2 is a schematic view of a computer networking system according to one embodiment of the present invention.

Referring to FIG. 2, a computer networking system according to one embodiment of the present invention is shown generally at 200. System 200 includes a remote client 202 configured to download data from a server 204 via computer network 216. Remote client 202 is typically a computing device, such as a personal computer (PCs), portable data assistant (PDAs), web-enabled wireless telephone, mainframe computer, etc.

Typically, remote client 202 accesses server 204 via a Wide Area Network (WAN) 216, such as the Internet. Server 204 may be connected to WAN 216 via a Local Area Network (LAN) 220. Remote client 202 may be connected to WAN 216 via connection 222. Connection 222 may be a direct connection to WAN 216 or an indirect connection via an Internet Service Provider (ISP). If client 202 is linked to an ISP, client 202 and the ISP typically are linked via a modem connection through the Public Switched Telephone Network (PSTN). A typical operating speed for the PSTN modem connection is approximately 56K bits per second (bps) or less, while a typical operating speed for direct broadband connection is between about 256K bps to 10 Megabits per second, and may be higher. Of course, it should be appreciated that virtually any other suitable connection method may be used in accordance with the embodiments of present invention.

Server 204 typically is configured to serve client 202 by providing a web resource 230 to a browser program 234 executed on remote client 202. Exemplary browser programs 234 include the NETSCAPE browser commercially available from Netscape Communications Corporation of Santa Clara, Calif. and the INTERNET EXPLORER browser commercially available from Microsoft Corporation of Redmond, Wash. The web servers and browsers typically communicate using the HyperText Transfer Protocol (HTTP). The web resource may be a new web page or part of a web page including web page source data, image data, sound data, video data, graphics data, embedded code such as a JavaScript applet, a stylesheet, or virtually any other resource accessible and interpretable by a browser via a Uniform Resource Indicator. The web resource may be statically or dynamically generated. Furthermore, the web resource may be encoded in, for example, an HTML or XML.

Figure 3:
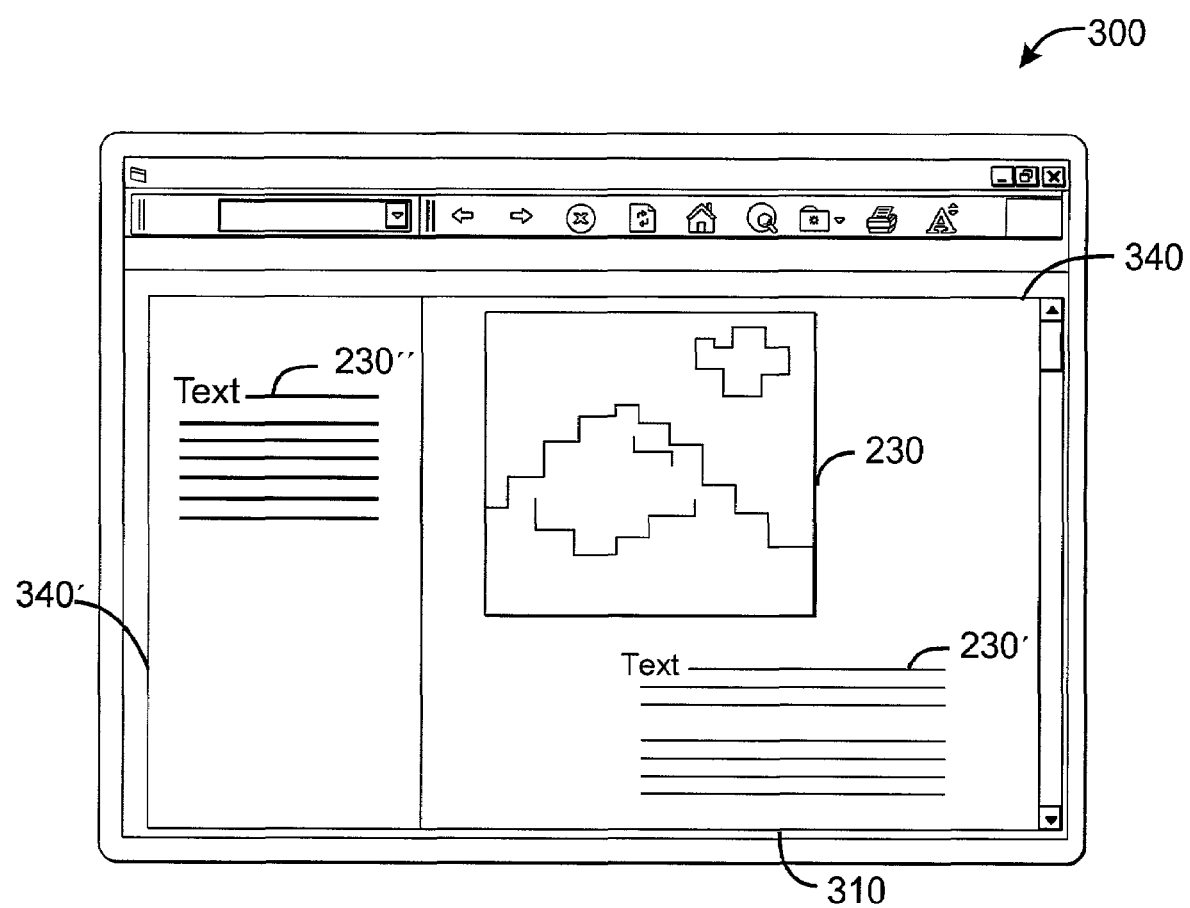
FIG. 3 is a schematic illustration of a typical web browser window.

FIG. 3 depicts a typical browser window 300 that might be displayed by browser program 234. Browser window 300 includes a web page 310, which includes one or more web resources 230, 230'. The browser window may be divided into a number of browser panes 340, 340', which may, themselves, each include one or more web resources 230". For the purposes of the present invention, the term "web page" shall refer inclusively to both entire web pages and to individual web panes.

Figure 4:
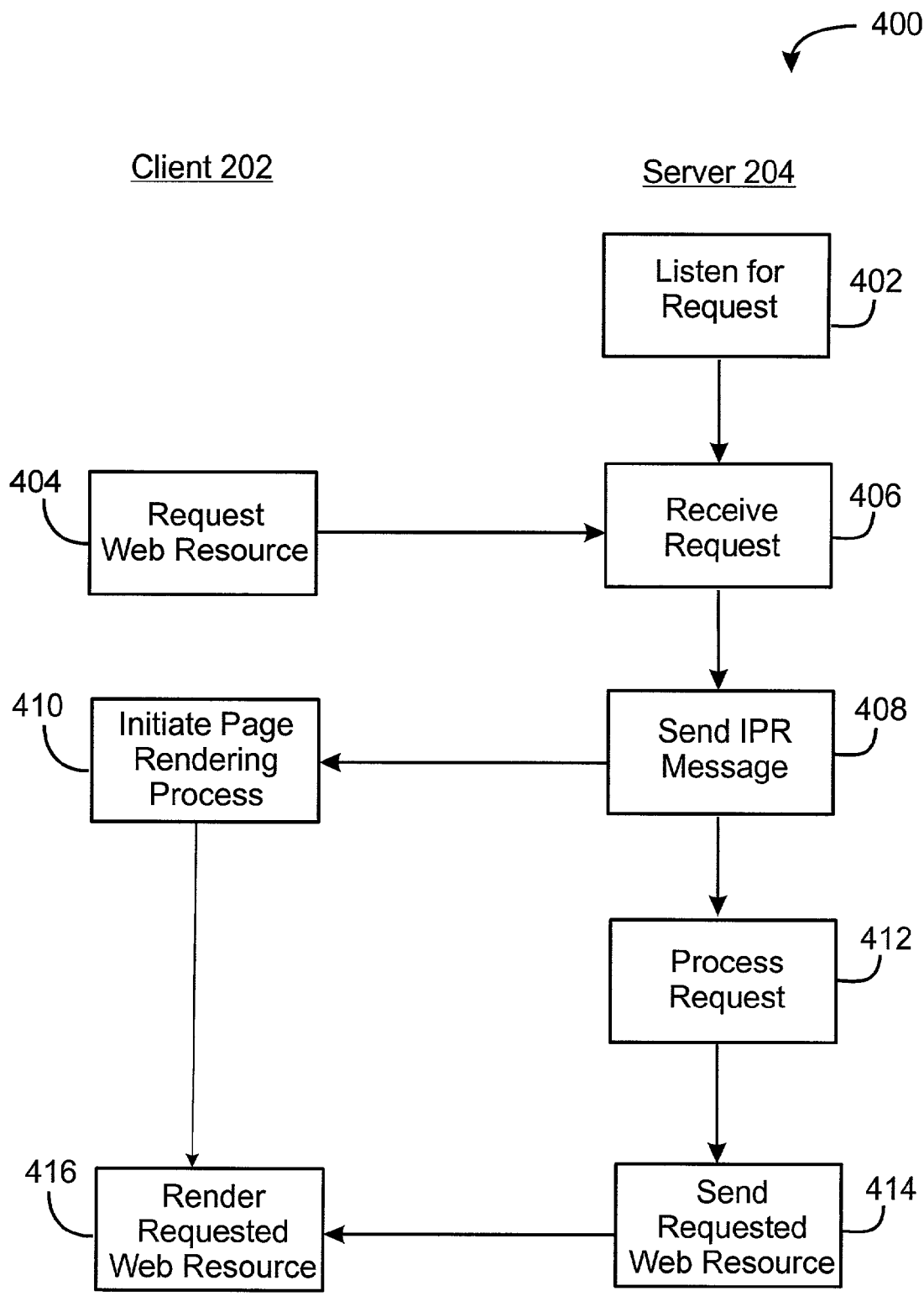
FIG. 4 is a flowchart of a method for computer networking according to one embodiment of the present invention.

FIG. 4 is a flowchart depicting one method for accelerating the downloading of a web page according to the present invention. Method 400 typically includes, at 402, listening at server 204 for a request for web resource 230. At 404, a request for web resource 230 is sent from remote client 202 to an IP address that the remote client browser associates with the web server 204. At 406, the method includes server 204 receiving a request for web resource 230 from remote client 202.

At 408, the method includes server 204 sending an initial response to the client 202 before the request is processed. Server 204 may be configured to serve multiple remote clients. In this case, server 204 may be configured to receive multiple requests for web resources from multiple clients. According to one embodiment of the present invention, server 204 may send the same initial response to each of the clients before processing each request.

Typically, this initial response is or includes an Initiate Page Rendering Message (IPR message). The IPR message is not necessarily dependant upon the content or nature of the request. In some embodiments, the IPR message is generic such that the same IPR message is sent each time the server receives a request, regardless of the contents of each individual request. In other embodiments, the IPR message is browser specific, such that the particular IPR message sent is determined at least in part by the particular browser used by the client. Alternatively, the IPR message may be request specific, such that the particular IPR message sent is determined, at least in part, by the content and/or nature of the request.

Whether the IPR message is generic, browser specific, or request specific, the IPR message instructs the remote client to initiate the page rendering process, as shown at 410. During the page rendering process, the current web page displayed in the browser window is wiped, even though the new web page has not yet been received. This early preparation of the browser window allows the new web page to be rendered as soon as the web resource is received from the server, without having to wait for the old page to be wiped, thereby reducing delay in presenting the web resource to the user.

At 412, the method includes server 204 processing the request. In this case, processing the request includes, reading the request, identifying the requested web resource, and obtaining the resource to send to remote client 202. The web resource may be obtained from a data storage medium and/or generated by the server. The web resource typically includes web page source data and associated image data. The web resource may also include other types of files such as video files, sound files, graphic animation files, embedded code files such as JavaScript applets, cascading stylesheets (CSS), etc. Web page source data typically is encoded using a markup language such as the HyperText Markup Language (HTML), while image data typically is encoded in a standard image format such as the JPEG, GIF, or animated GIF image formats. It will be appreciated that other suitable file formats may be used for the web page source data and the image data.

At 414, the method includes server 204 sending the requested web resources to the remote client 202. At 416 the method includes client 202 rendering the requested web resources in a new web page.

Figure 5:
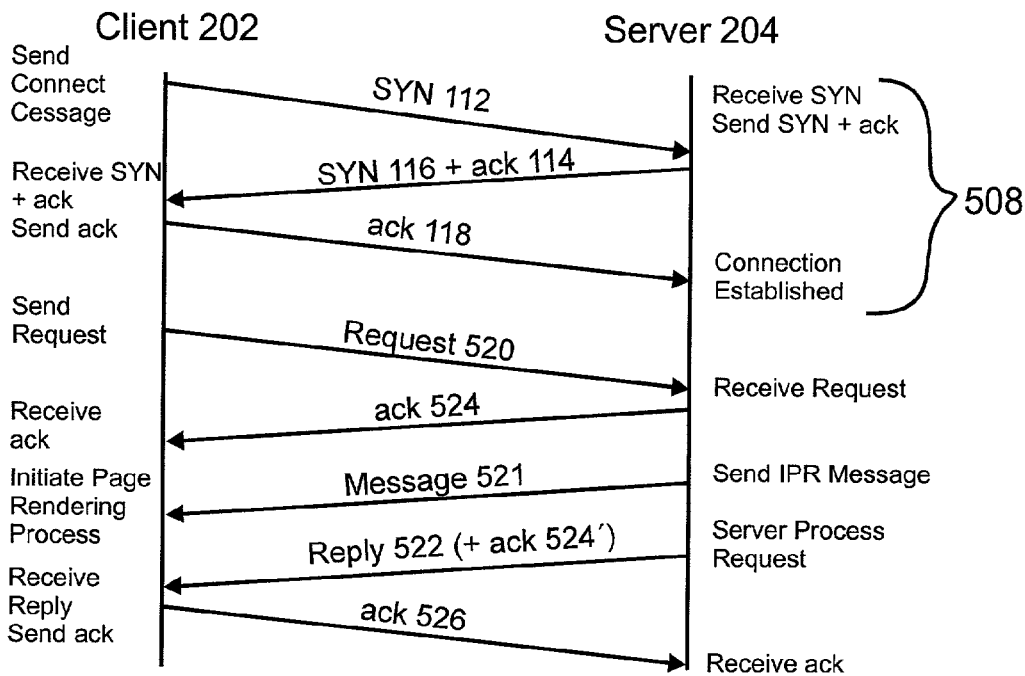
FIG. 5 is a schema of a TCP network packet exchange according to an embodiment of the present invention.

FIG. 5 depicts a typical client-server exchange according to one embodiment of the present invention. The initial connection between a server 204 and a remote client 202 is established using a standard three-part handshake 508. Once the connection is established, client 202 sends a request 520 for a web resource. Server 204 may send an ack 524 acknowledging the request, or may send a delayed ack 524' bundled with a reply 522, which includes some or all of the requested web resource.

In contrast to the example shown in FIG. 1, in the exchange shown in FIG. 5, server 204 responds to request 520 by sending IPR message 521 for the purpose of initiating the page rendering process as described above with reference to step 410. Generally, message 521 is an application-level message. According to one embodiment of the present invention, message 521 is a generic message or includes an initial generic portion of the response. As used herein, the term "generic" is used to refer to a message that will be sent to all requesting clients, i.e. a message that is not request-specific. Typically, the generic message or portion is the first few bytes of information that will be sent in reply 522. Typically, message 521 contains between one and four bytes but may contain more, as required or desired.

For example, according to the TCP protocol, reply 522 begins with the protocol used to transmit data to the requesting client. For all web resources, the reply begins with an "HTTP", regardless of the content of the requested web resource.

Thus, according to the present invention, message 521 may include "HTTP" or a partial variant thereof, such as "H". In this context, "H" and "HTTP" are generic or content-independent predetermined responses to request 520. Therefore, message 521 may take the form of either an "H" or an "HTTP," regardless of the specific web resource requested by client 202. Moreover, reception of HTTP-level data such as "H" or "HTTP" by browser 234 remote client 202 initiates the page rendering process in the browser of the remote client, thereby acting as an IPR message to wipe the browser window clean prior to the arrival of the requested web resource. As discussed above, this reduces the time it takes the browser to ultimately display the requested web resource to the user.

Server 204 typically processes request 520 and sends reply 522. As stated above, this reply may or may not be sent with a second ack 524'. As will be appreciated by those of skill in the art, reply 522 may be sent in one or more packets, depending upon the size of the requested web resource. Once client 202 receives the reply, the client may send an ack 526 back to server 204. Those of skill in the art will realize that ack 526 may, in fact, be a series of acks acknowledging individual or accumulated packets of information or may be a single delayed ack sent only after the entire web resource is sent. Typically, this process is repeated for each request initiated by the remote client 204.

The system, method, and device of the present invention are suitable for use with other systems, methods, and devices for accelerating communication between the client and server. Some of these systems, methods and devices are described in co-pending U.S. patent applications Ser. Nos. 09/680,675 (U.S. Pat. No. 6,834,297) 09/680,997, and 09/680,998, filed Oct. 6, 2000, Nos. 60/239,552 and 60/239,071, filed Oct. 10, 2000, No. 60/287,188, filed Apr. 27, 2002, No. 60/308,234 filed Jul. 26,2001, and No. 60/313,006 filed Aug. 16,2001, the disclosures of each of which are herein incorporated by reference. Briefly, the above-incorporated applications describe a system, methods, and devices including an acceleration device that resides between a server and a client.

Figure 6:
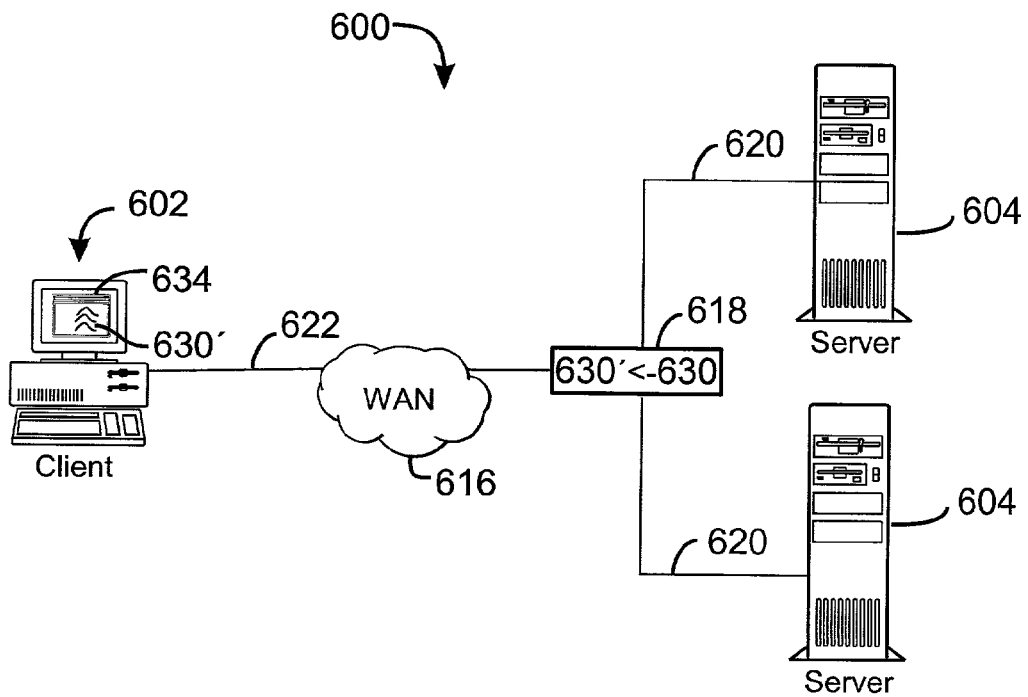
FIG. 6 is a schematic view of a computer networking system according to another embodiment of the present invention.

Referring to FIG. 6, a computer networking system utilizing an acceleration device is shown generally at 600. System 600 typically includes at least one remote client 602 configured to download data, such as a web resource 630, from one or more servers 604 via computer network 616. As with system 200, described above with reference to FIG. 2, remote clients 602 are typically computing devices, such as personal computers (PCs), portable data assistants (PDAs), web-enabled wireless telephones, mainframe computers, etc.

System 600 further includes an acceleration device 618 positioned intermediate each of remote clients 602 and servers 604. Suitable acceleration devices are more fully described in the above-referenced co-pending patent applications, the disclosures of which are incorporated by reference. Acceleration device 618 may act as a proxy between client 602 and server 604. Furthermore, acceleration device 618 is configured to modify a web resource on its way to the client in a manner that accelerates the transmission of data between the server 604 and remote client 602. For example, the acceleration device may be configured to filter out non-renderable data from the web resource, or compress the web resource.

Typically, acceleration device 618 is a stand-alone appliance linked to a computer network 616. According to an alternative embodiment of the invention, system 600 may include an acceleration device integrated into a server. Acceleration device 618 may be connected to servers 604 in a one-to-one relationship, or in a one-to-many relationship, as shown. When one acceleration device 618 is linked to several servers 604, it functions to distribute requests from remote clients 602 to the many servers 604, thereby approximately balancing the load placed on each of the servers. Likewise, acceleration device 618 may be connected to more than one client 602. In this case, acceleration device 618 may be adapted to receive and process multiple requests from multiple clients.

Typically, acceleration device 618 is connected to servers 604 via Local Area Networks (LANs) 620, and is connected to remote client 602 via a computer network 616, which is typically a Wide Area Network (WAN) 616, such as the Internet. As in system 200, remote client 602 may be connected to WAN 616 via a connection 622, which may be either a direct broadband connection or an indirect Internet Service Provider (ISP).

Acceleration device 618 is typically configured to modify at least a portion of an original web resource 630 to form a size-optimized web resource 630' having a smaller file size than the original web resource. Acceleration device 618 typically is further adapted to send the size-optimized web resource to remote client 602. In some embodiments, any data not sent in the initial transmission may be sent to the remote client browser at a later time. In this manner, acceleration device 618 is configured to receive and modify the response sent to web client 602 in order to accelerate the transmission of a web resource from web server 604 to remote client 602. If acceleration device 618 is configured to receive multiple requests from multiple clients, acceleration device 618 may be further configured to distribute multiple modified responses to the clients, as appropriate.

The modified web resource 630' can be downloaded and displayed at the remote client 602 by a browser program 634. Because modified web resource 630' is smaller than original web resource 630, the time to download web resource 630' is typically much shorter than the time required to download web resource 630.

Figure 7:
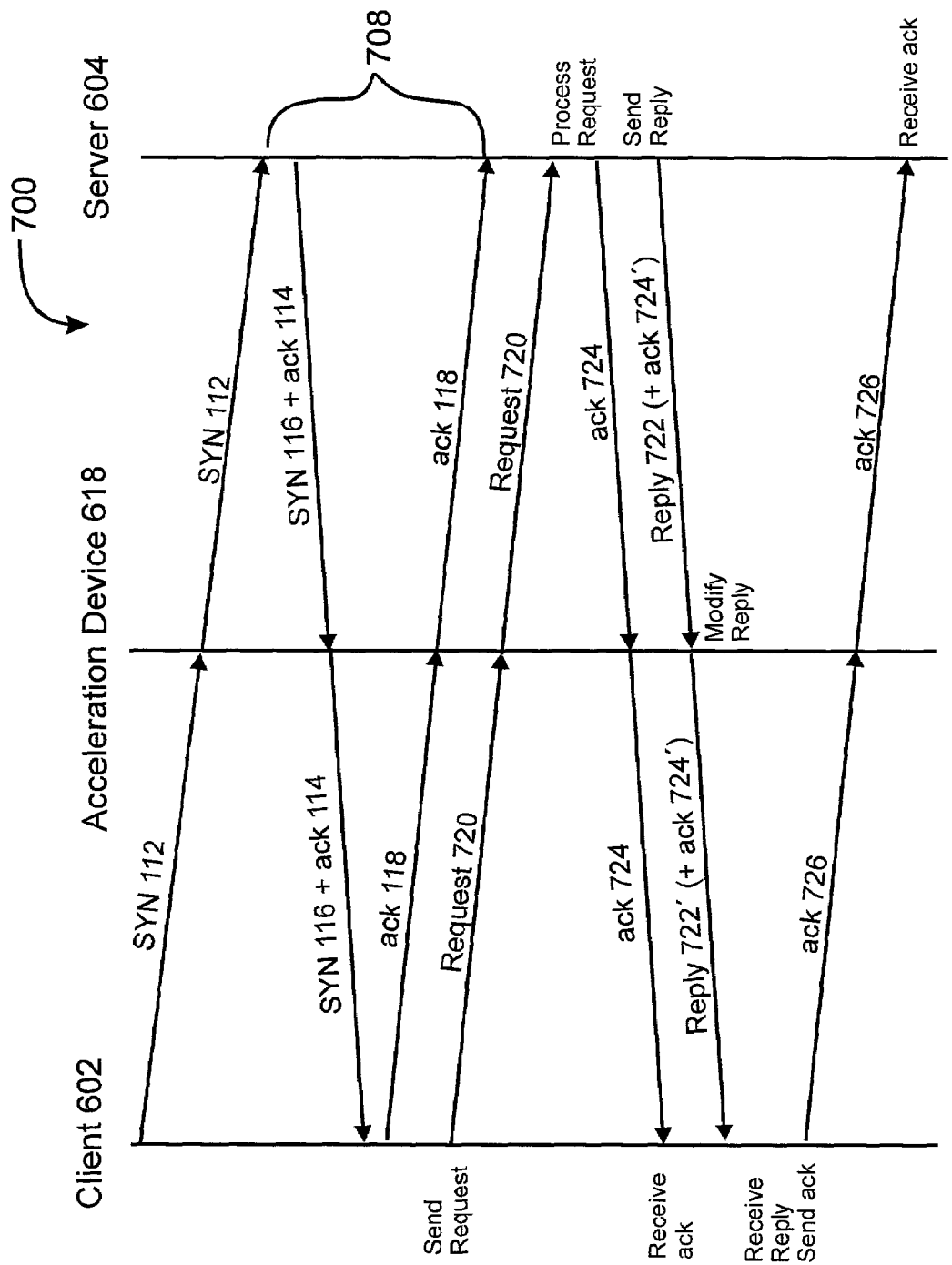
FIG. 7 is a schema of a TCP network packet exchange utilizing an acceleration device.

FIG. 7 depicts a TCP exchange 700 wherein the speed of communication between the client 602 and the server 604 is increased by an acceleration device 618. In the example shown in FIG. 7, an initial connection between server 604 and a remote client 602 is established using a three-way handshake 708, similar to that described above with reference to FIG. 5. However, in the depicted exchange, each of the handshake messages is sent through acceleration device 618.

Once the connection is established, client 602 sends a request for a web resource to server 604 via acceleration device 618. As previously described, server 604 may send an ack 724 immediately upon receipt of the request, or may send delayed ack 724' with reply 722. Server 604 obtains the requested web resource and sends reply 722 including the original requested web resource 630 (and, optionally, ack 724') in response. Acceleration device 618 receives reply 722 and modifies the original web resource 630, as described above and in further detail in U.S. patent application Ser. Nos. 09/680,675 (U.S. Pat. No. 6,834,297), 09/680,997, and 09/680,998, previously incorporated by reference above. Acceleration device 618 sends the modified reply 722' including modified web resource 730' (and ack 724', if appropriate) to client 602. Client 602 receives reply 722', responds by sending an ack 726 to server 604, and downloads modified web resource 630'.

Figure 8:
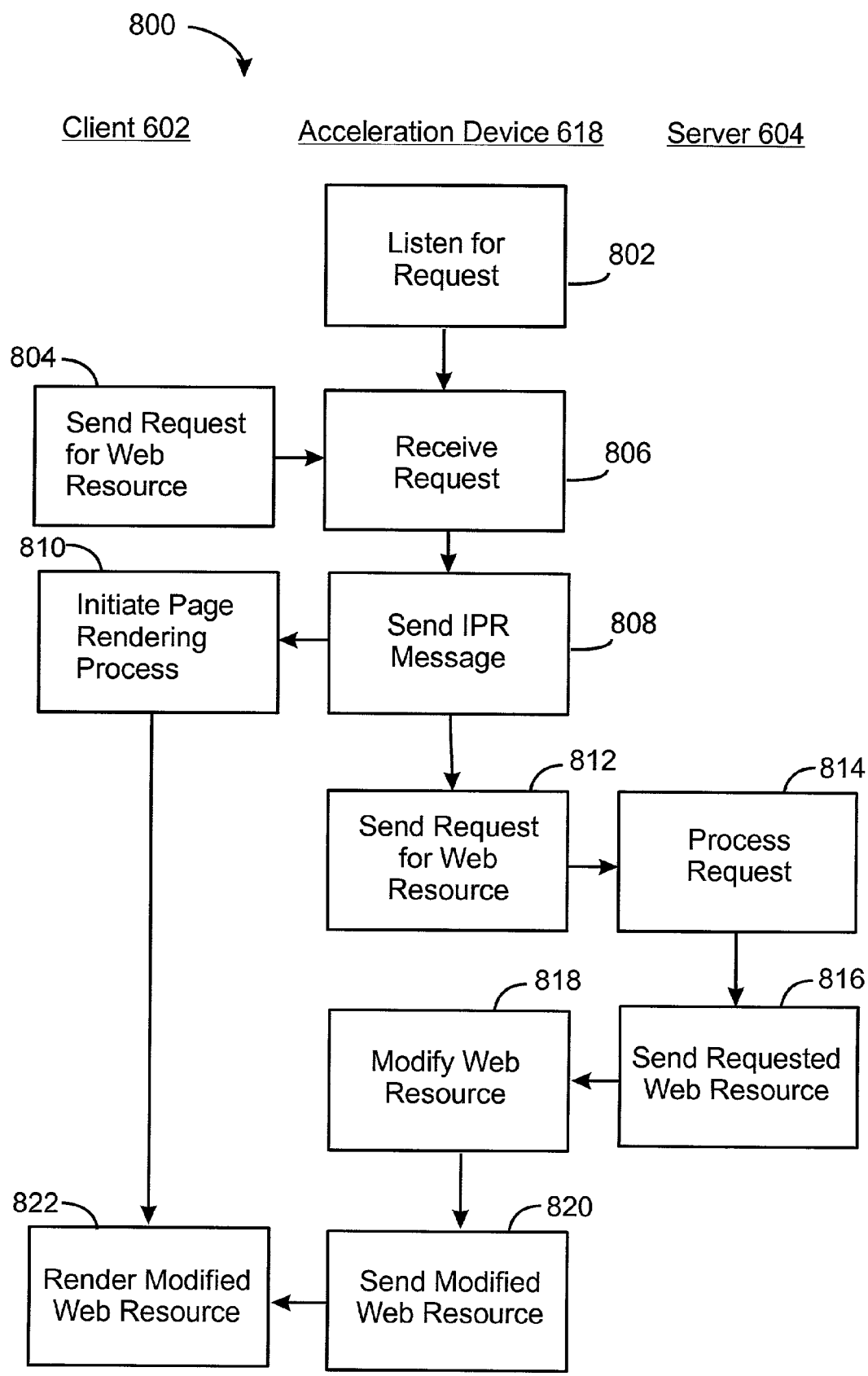
FIG. 8 is a flowchart of a method for computer networking utilizing an acceleration device according to another embodiment of the present invention.

Turning now to FIG. 8, a method according to one embodiment of the present invention is shown generally at 800. Method 800 typically includes, at 802, listening at acceleration device 618 for a request for web resource 630. At 804, the method typically includes receiving a request for web resource 630 from remote client 602. At 806, the request typically is received by acceleration device 618.

The method typically includes at 808, upon receipt of the request by acceleration device 618, sending a generic message to client 602. The generic message is typically sent virtually immediately upon receipt of the request by acceleration device 618. As stated above, acceleration device 618 may be configured to receive multiple requests from multiple clients. In this case, acceleration device 618 may send the same generic message to each of the requests prior to processing the requests.

As described above, the generic message is typically an IPR message. At 810, the method typically includes client 602 initiating the page rendering process in response to the IPR message.

At 812, the method typically includes acceleration device 618 sending the request for the web resource to server 604. While step 808 is typically executed before 812, it will be appreciated that step 812 may take place after 808, or that steps 808 and 812 may take place simultaneously, that is, acceleration device 618 may send the IPR message to client 602 while at the same time passing the request on to server 604. Irrespective of the order of steps 808 and 812, client 602 typically begins the page rendering process upon receipt of the IPR message, before receiving the requested web resource.

At 814, the method typically includes server 604 obtaining the requested web resource 630. At 816, the method typically includes server 604 sending the requested web resource 630 to acceleration device 618. At 818 the method typically includes the acceleration device 618 modifying the requested web resource 630 in a manner such as that described above to create a modified web resource 630'. At 820, the method typically includes acceleration device 618 sending the modified web resource 630' to remote client 602. At 822, the method typically includes client 602 rendering the modified web resource. As described above, the complete originally requested web resource may be sent later.

Figure 9:
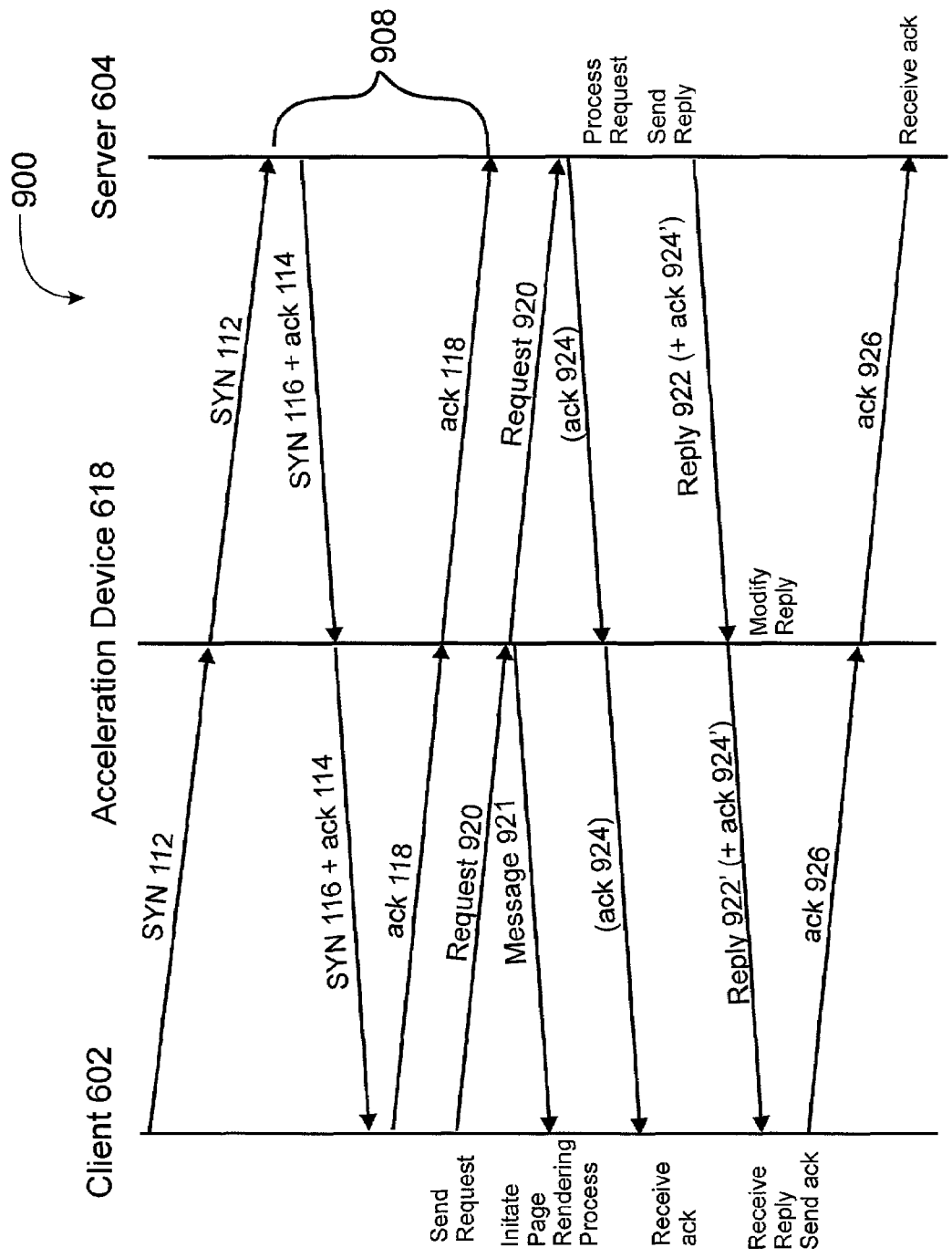
FIG. 9 is a schema of a TCP network packet exchange utilizing an acceleration device.

FIG. 9 depicts a TCP exchange according to another embodiment of the present invention, utilizing an acceleration device 618. As described above, a connection between the client and server is established by completion of three-part handshake 908. Client 602 sends an original request 920 to server 604 via acceleration device 618. As soon as acceleration device 618 receives request 920, the acceleration device sends IPR message 921 to client 602. In response to message 921, client 602 prepares to receive the requested reply by initiating the page rendering process. That is, client 602 typically wipes the current browser window clean in preparation to display new data.

Meanwhile, request 920 is received by server 604, which obtains the requested data and sends reply 922 (and optionally, ack 924') back to client 602. As described above, server 604 may send ack 924 to client 602 upon receipt of request 920. Reply 922 is intercepted by acceleration device 618 and modified prior to being delivered as modified reply 922' to client 602. As described above, this modification allows client 602 to download modified reply 922' more rapidly than it would have been able to download the original reply 922. In addition, because client 602 had previously begun the page rendering process, reply 922' may be downloaded as soon as it is received, rather than waiting for any pre-existing pages to be wiped.

The above-described invention may be used to accelerate data transmission over a computer network, in order to decrease delay and provide users with a more pleasurable experience.

While the present invention has been particularly shown and described with reference to the foregoing preferred embodiments, those skilled in the art will understand that many variations may be made therein without departing from the spirit and scope of the invention as defined in the following claims. The description of the invention should be understood to include all novel and non-obvious combinations of elements described herein, and claims may be presented in this or a later application to any novel and non-obvious combination of these elements. Where the claims recite "a" or "a first" element or the equivalent thereof, such claims should be understood to include incorporation of one or more such elements, neither requiring nor excluding two or more such elements.

EXAMPLE

FIGS. 10 and 11 show exemplary time logs of a transmission without the present invention (FIG. 10) and a transmission with one embodiment of the present invention (FIG. 11). Those of skill in the art will recognize that in FIG. 11 at time stamp 6, four bytes of information were sent to address 192.168.0.100. These four bytes of information may serve as an IPR message and could, for example, take the form of an "HTTP." As explained above, according to alternative embodiments of the present invention, the IPR message may include more or less than four bytes.

We claim:

1. A method for computer networking, comprising:
   receiving a request for a web resource from a remote client;
   sending an acknowledgement to the remote client;
   after sending the acknowledgment to the remote client and prior to processing the request to identify the requested web resource, sending a pre-determined message to initiate a page rendering process at the remote client, wherein content of the message is the same regardless of the requested web resource;
   processing the request to identify the requested web resource and produce a response; and
   sending the requested response to the client.

2. The method of claim 1 wherein the web resource is a new web page.

3. The method of claim 1 wherein the web resource is statically generated.

4. The method of claim 1 wherein the web resource is encoded in an HTML file.

5. The method of claim 1 wherein the web resource is dynamically generated.

6. The method of claim 1 wherein the web resource is encoded in an XML file.

7. The method of claim 1 wherein the request is received at a server.

8. The method of claim 7 wherein the server is a first server configured to act as a proxy between the client and a second server configured to serve the requested web resource.

9. The method of claim 8 wherein the first server is configured to accelerate the time it takes for the client to download the requested web resource from the second server.

10. The method of claim 1 wherein the message is an application level message.

11. The method of claim 10 wherein the message is an initial generic portion of the response that is independent of the web resource requested, and wherein processing the response produces a remainder of the response based on the request.

12. The method of claim 11 wherein the message includes the first byte of the response.

13. The method of claim 11 wherein the message includes the first four bytes of the response.

14. The method of claim 11 wherein the message is limited to the first byte of the response.

15. The method of claim 11 wherein the message is limited to the first four bytes of the response.

16. The method of claim 1 wherein the request is received after executing a TCP handshake.

17. The method of claim 11 wherein the message is an "H".

18. The method of claim 11 wherein the message is an "HTTP".

19. The method of claim 16 wherein the message begins with an "H".

20. The method of claim 16 wherein the message begins with an "HTTP".

21. A method for computer networking, comprising:
receiving multiple requests from one or more remote clients, each of the requests being for a different one of a plurality of web resources;
after sending acknowledgments to the remote client and before processing one or more of the requests, sending pre-determined messages to the clients to initiate page rendering at the clients;
processing the requests; and
sending a response to each of the clients including at least a portion of the requested web resource.

22. The method of claim 21 wherein the message is an application level message.

23. The method of claim 22 wherein the message is an IPR message.

24. The method of claim 22 wherein the message is an initial generic portion of the response.

25. The method of claim 24 wherein the message includes the first byte of the message.

26. The method of claim 21 wherein the request is sent after executing a TCP handshake.

27. The method of claim 26 wherein the message includes an "H".

28. The method of claim 26 wherein the message includes an "HTTP".

29. A networking device for use on a computer network connecting a web server and remote clients, wherein each of the remote clients is configured to download a web resource from the web server via the computer network and display the web resource via a browser, the device comprising a controller configured to:
receive multiple requests from one or more remote clients, each request being for one of a plurality of web resources;
prior to forwarding one or more of the requests to the web server, send a generic, predetermined message to initiate the page rendering process at the browser of each of the clients;
forward the requests to the web server;
after forwarding the request to the web server, receive an acknowledgement and a reply from the server for each of the requests; and
send the acknowledgements and the requested web resources to the clients via the computer network.

30. A system for use with a computer network to which a plurality of remote clients are connected, the system comprising a server configured to receive a request for a web resource from a remote client and, after sending an acknowledgement to the remote client and prior to processing the request, send to the remote client a pre-determined message adapted to initiate a page rendering process, and initiating a procedure after sending the pre-determined message, wherein the procedure processing the request to identify the requested web resource and produce a response, and sending the requested response to the client.

31. The system of claim 30 wherein the server is a web server.

32. The system of claim 30 wherein the server is a first server configured to act as a proxy between the remote clients and a second server configured to serve the requested web resource.

33. The system of claim 32 wherein the first and second server are connected via a local area network.

34. The system of claim 30 wherein the page rendering process is initialized by an application level message.

35. The system of claim 34 wherein the message is an initial generic portion of the response.

36. The system of claim 35 wherein the message includes the first byte of the message.

37. The system of claim 36 wherein the message is an "H".

38. The system of claim 37 wherein the message is an "HTTP".

39. A system for use in computer networking, the system comprising:
a computer network;
a web server;
a remote client configured to request a web resource from the web server via the computer network; and
an acceleration device positioned intermediate the web server and the remote client on the computer network; the acceleration device being configured to, upon receipt of the request and prior to forwarding the request to the web server, send an application level, request-independent message to the remote client before processing the request, wherein the message is a predetermined message having content that does not change for subsequent requests to different web resources of the web server,
wherein, after forwarding the request to the web server, the acceleration device receives an acknowledgement and a reply from the server and forwards the acknowledgement and reply to the client device.

40. The system of claim 39 wherein the acceleration device is further configured to accelerate transmission of the web resource from the web.

41. The system of claim 39 wherein the application level message is an IPR message.

42. An article comprising: a storage medium comprising a plurality of machine-readable instructions, wherein when the instructions are executed by a computing system, the instructions provide for:

receiving multiple requests from one or more clients; each client configured to display a web resource via a browser and each request being for a web resource;

sending an acknowledgement to the remote client;

after sending the acknowledgment to the remote client, sending, in response to, and before processing of, the request, a generic message adapted to initiate a page rendering process at the browser, wherein the message is a predetermined message having content that does not change for subsequent requests;

processing the request by obtaining the requested web resource; and sending the requested web resource to each of the clients.

* * * * *

UNITED STATES PATENT AND TRADEMARK OFFICE
CERTIFICATE OF CORRECTION

| | |
|---|---|
| PATENT NO. | : 7,127,503 B2 |
| APPLICATION NO. | : 09/975282 |
| DATED | : October 24, 2006 |
| INVENTOR(S) | : Steve Malmskog |

It is certified that error appears in the above-identified patent and that said Letters Patent is hereby corrected as shown below:

On the title of the patent item (75), inventor's name should read --Steve Malmskog-- instead of "Steve Malrnskog".

Signed and Sealed this

Twenty-first Day of August, 2007

JON W. DUDAS
*Director of the United States Patent and Trademark Office*